(12) United States Patent
May et al.

(10) Patent No.: US 10,341,256 B2
(45) Date of Patent: *Jul. 2, 2019

(54) EXCHANGE SWITCH PROTOCOL VERSION IN A DISTRIBUTED SWITCH ENVIRONMENT

(71) Applicant: International Business Machines Corporation, Armonk, NY (US)

(72) Inventors: Henry J. May, Cedar Falls, IA (US); Christoph Raisch, Gerlingen (DE); Stefan Roscher, Stuttgart (DE); Daniel Sentler, Steinenbronn (DE); Bharath B. Somayaji, Bangalore (IN); Sudheer R. Yelanduru, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 14/251,335

(22) Filed: Apr. 11, 2014

(65) Prior Publication Data
US 2015/0271065 A1 Sep. 24, 2015

Related U.S. Application Data

(63) Continuation of application No. 14/219,784, filed on Mar. 19, 2014.

(51) Int. Cl.
*H04L 12/931* (2013.01)
*H04L 12/933* (2013.01)

(52) U.S. Cl.
CPC ........ *H04L 49/1507* (2013.01); *H04L 49/357* (2013.01); *H04L 49/65* (2013.01)

(58) Field of Classification Search
CPC ... H04L 49/357; H04L 67/1097; H04L 69/24; G06F 3/067; G06F 8/71; H04W 28/18
See application file for complete search history.

(56) References Cited

U.S. PATENT DOCUMENTS 7,243,367 B2  7/2007 Kleinsteiber et al.
7,433,326 B2  10/2008 Desai et al.
(Continued)

FOREIGN PATENT DOCUMENTS

EP   2475111 A1   7/2012

OTHER PUBLICATIONS

Maino et al. "FCsec: a security framework for Fibre Channel." (T11/02-071v0) ftp://ftp.t11.org/t11/member/fc/security/02-071v0.pdf Feb. 4, 2002, pp. 1-28.
(Continued)

*Primary Examiner* — Marsha D Banks Harold
*Assistant Examiner* — Elton Williams
(74) *Attorney, Agent, or Firm* — Patterson + Sheridan, LLP (57) ABSTRACT

Techniques are provided for two components in a distributed Fiber Channel Forwarder (FCF) to establish a link between them at a level of operation that is mutually compatible with respect to the various capabilities offered by the two components. A controlling switch in the distributed FCF may simultaneously operate at different levels with different Fiber Channel Data-Plane Forwarders (FDFs), on a per-pair basis. The level of operation is established at the granularity of an individual capability offered by a switching element. When switching elements are upgraded, the switching elements can dynamically switch to higher or lower levels of operation for any or all of the capabilities defined per pair of switching element.

16 Claims, 6 Drawing Sheets

(56) References Cited

U.S. PATENT DOCUMENTS

| | | | |
|---|---|---|---|
| 7,447,198 B1 | 11/2008 | Banks et al. | |
| 7,466,659 B1* | 12/2008 | Kazar | H04L 69/22 |
| | | | 370/252 |
| 2003/0120915 A1 | 6/2003 | Kleinsteiber et al. | |
| 2004/0148376 A1 | 7/2004 | Rangan et al. | |
| 2011/0044344 A1* | 2/2011 | Hudson | H04L 12/433 |
| | | | 370/395.53 |
| 2012/0307822 A1 | 12/2012 | Eisenhauer et al. | |
| 2013/0148659 A1* | 6/2013 | Shukla | H04L 61/6045 |
| | | | 370/390 |
| 2013/0287389 A1* | 10/2013 | Ayandeh | H04L 41/0668 |
| | | | 398/5 |

OTHER PUBLICATIONS

Hofer, "FC-IFR Security," T113 FC IFR T1105-520v0 McData Corp., pp. 1-3.

Fibre Channel, Switch Fabric-5 (FC-SW-5) Rev 8.5, INCITS working draft proposed American National Standard for Information Technology, Chapters 6.1.21-6.1.22, Jun. 3, 2009, pp. 83-95, http://www.t11.org/ftp/t11/pub/fc/sw-5/09-290v1.pdf.

Peterson, "SW_ILS TLV format(s)" Brocade (11-216v0), Jun. 7, 2011, pp. 1-8.

* cited by examiner

EXCHANGE SWITCH PROTOCOL VERSION IN A DISTRIBUTED SWITCH ENVIRONMENT

CROSS-REFERENCE TO RELATED APPLICATIONS

This application is a continuation of co-pending U.S. patent application Ser. No. 14/219,784, filed Mar. 19, 2014. The aforementioned related patent application is herein incorporated by reference in its entirety.

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

Fibre Channel (FC) can be used to connect these servers and computing resources, including connecting computer systems to storage devices such as storage area network (SAN) devices. Fibre Channel is a high speed medium primarily used for data transfer and storage, but may also be used to connect other devices, servers, printers, etc. Fibre Channel is essentially a serial data channel, often created over fiber optic cabling, that provides a logical bi-directional, point-to-point connection between a host and a device.

BRIEF SUMMARY

Embodiments of the present disclosure provide a method, computer program product, and system for managing a distributed Fibre Channel (FC) fabric. The method includes establishing a switch link between a first switching element and a second switching element of a distributed Fibre Channel fabric, and transmitting, to the second switching element, a control-plane request frame that specifies at least one version of a protocol supported by the first switching element. The method further includes receiving, from the second switching element, a control-plane response frame that specifies an accepted version of the protocol mutually supported by the first switching element and the second switching element. The method includes operating the switch link established between the first switching element and the second switching element using the accepted version of the protocol.

Another embodiment of the present disclosure provides a method, computer program product, and system for managing a distributed FC fabric that includes establishing a switch link between a first switching element and a second switching element of a distributed Fibre Channel fabric. The method includes receiving, from the first switching element, a control-plane request frame that specifies a first supported version of a protocol supported by the first switching element. The method further includes determining an accepted version of the protocol that is mutually supported by the first switching element and the second switching element based on a comparison of the first supported version to a list of capabilities associated with the second switching element. The method includes transmitting, to the first switching element, a control-plane response frame that specifies the accepted version of the protocol, and operating the switch link established between the first switching element and the second switching element using the first accepted version of the protocol.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Devices may be connected on Fibre Channel systems using various interconnection topologies and devices, such as switches, hubs, and bridges, to allow scalability based on users' needs. As Fibre Channel networks get larger and network demands increase, switching may be implemented. A switched Fibre Channel network is referred to herein a "fabric." A fabric is simply the underlying switching architecture used by a Fibre Channel switch. A fabric may contain many loops interconnected with switches. Standards committees, such as the FC-BB-6 and FC-SW-6 working groups of the Technical Committee for Fibre Channel (T11) of the International Committee for Information Technology Standards (INCITS), have been working to develop a distributed switch model, with associated protocols, where a distributed Fibre Channel Forwarder (FCF) employs separate physical switching elements to perform control-plane and data-plane functionality. The distributed switch model and associated protocols of the current state of the art may be applied to both standard FC switches and switches configured to transport FC frames over different networking technologies, such as Fibre Channel over Ethernet (FCoE).

When the distinct physical elements of a distributed FCF are initiating connections with each other, it may be desirable to determine if the switch elements are operating on compatible versions of the same communications protocol, e.g., compatible version of the Fibre Channel Backbone (FC-BB-6) standard. In one example, in the draft standard for FC Switch Fabric (FC-SW-6), a Fabric Login (FLOGI) processing is currently defined by a sequence of a VN_Port Reachable Notification (VNRN), a N_Port_ID and Zoning ACL Distribution (NPZD) message, a NPDZ acceptance message, a VNRN acceptance message, and a FLOGI acceptance message, or sometimes represented as VNRN-NPZD-NPZD ACC-VNRN ACC-FLOGI ACC. However, in a future version, this sequence of messaging may change. It may be desirable to have a mechanism to associate a version at such levels of the protocol. Existing data fields in a packet, such as a version field in the header field of a packet, can only indicate to a switch how to parse the contents of that particular packet. Other approaches, such as an Exchange Switch Support message (i.e., ESS SW_ILS) or an Exchange Capability Support message (i.e., ESC SW_ILS) may indicate properties of switch itself, but do not provide any way for switches to communicate and negotiate the operating version of the entire protocol between switches.

Accordingly, embodiments of the present disclosure provide a mechanism for switches in a distributed FCF to determine the operating version of a protocol, or set of protocols, between switches. Such switches, which may support different versions/protocols, are configured to learn about any incompatibilities in protocol support during a link instantiation process. Each physical switch may be able to establish a mutually compatible version with every other physical switch for each protocol, or sets of protocols, that run between the physical switches. As such, it is possible for a physical switch configured according to embodiments described herein to operate at different compatible versions with different physical switches. Unlike in prior approaches, such as ESC SW_ILS, where switches differing in capabilities do not operate with each other, embodiments of the present disclosure provide a facility where different switches in the fabric can operate in different versions of the same protocol in a coordinated manner. If two switching elements support a certain protocol, but differ in the interpretation of the protocol due to incompatible software versions, embodiments described herein provide the ability to negotiate and agree on a mutually agreeable version of the protocol.

In the following, reference is made to embodiments of the disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
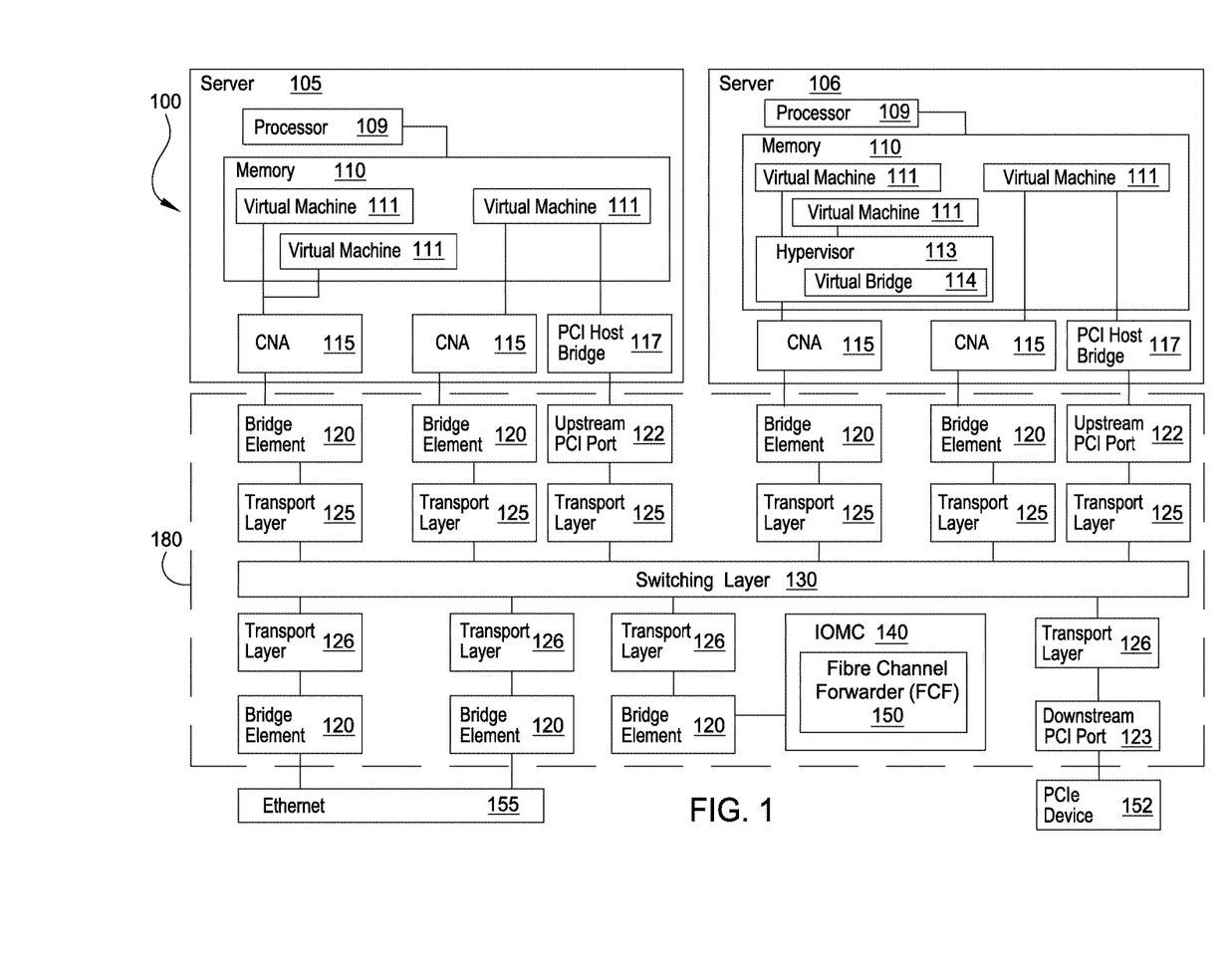
FIG. 1 illustrates a system architecture that includes a distributed network switch, according to one embodiment of the present disclosure.

FIG. 1 illustrates a system architecture 100 that includes a distributed network switch 180, according to one embodiment of the present disclosure. The computer system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125, 126 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 125 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

The distributed network switch 180 may be configured to act as an FCoE Forwarder (FCF) 150, which is a Fibre Channel switching element that is able to forward FCoE frames across one or more switch ports to connected endpoints (i.e., servers 105, 106, storage devices). One example of an FCoE Forwarder is further described in the Fibre Channel Backbone 5 (FC-BB-5) standard published by T11 working group of the International Committee for Information Technology Standards (INCITS).

In the embodiment shown, IOMC 140 may include an FCoE Forwarder (FCF) 150. As discussed earlier, FCoE offers the capability to transport fiber channel payloads on top of an Ethernet network. The FCF 150 may execute a Fiber Channel Initialization Protocol (FIP) to discover and initialize FCoE-capable entities connected within the distributed network switch 180. The FCF 150 may further include firmware that encapsulates and de-encapsulates Fiber Channel data frames (e.g., FCoE formatted data frames). In at least one embodiment, the Fiber Channel Forwarder 150 may translate between Ethernet and Fiber Channel protocols. In the embodiment shown, the IOMC 140 is depicted in FIG. 1 having an instance of a FCF 150 that manages execution of FCF functionality across the bridge elements 120 of the distributed network switch 180. In one embodiment, the FCF 150 may be a distributed FCF where a controlling FCF element provides FC services to a large number of endpoints through many intermediate switches. An example of a distributed FCF is shown in FIG. 2.

Figure 2:
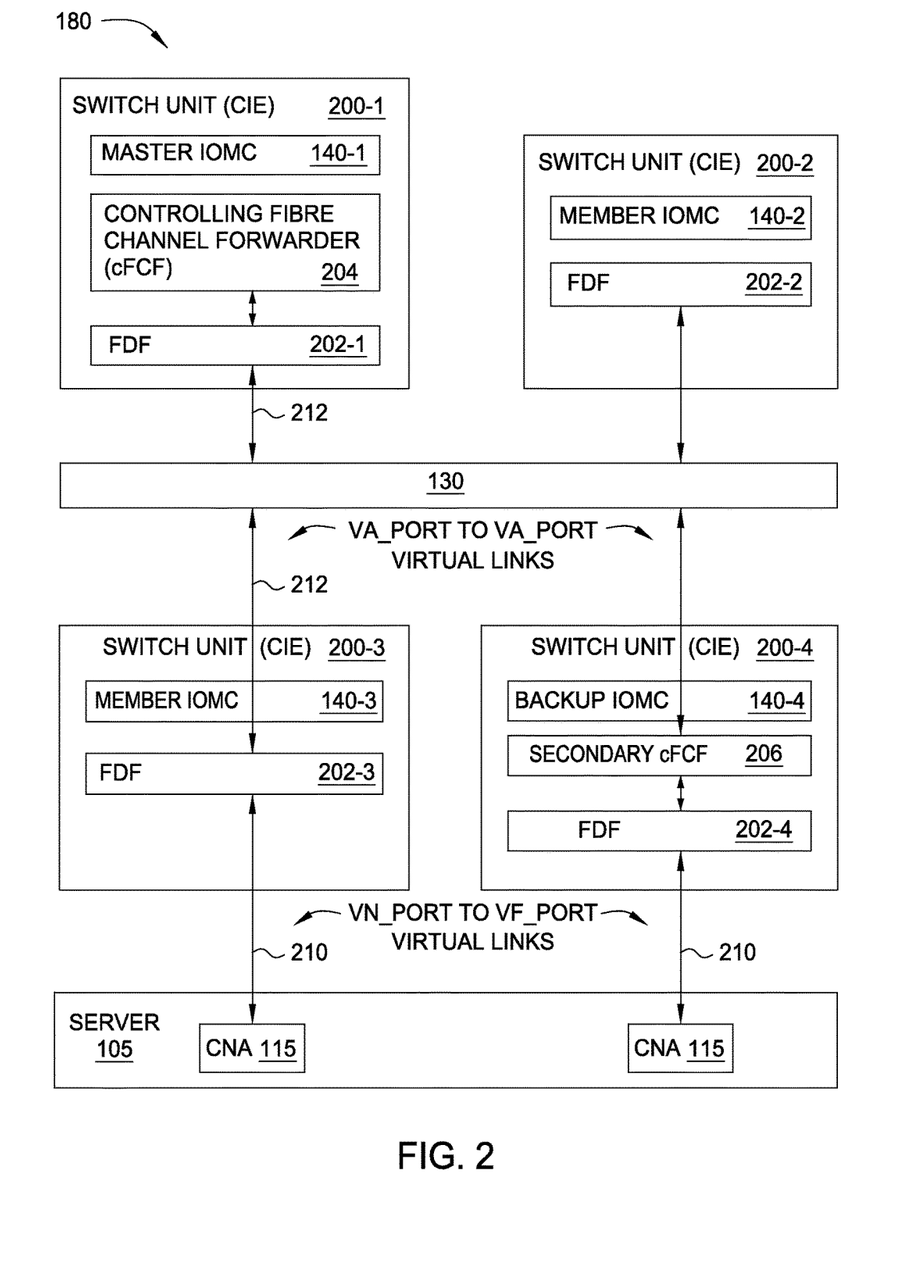
FIG. 2 illustrates the distributed network switch configured for Fibre Channel switching, according to one embodiment of the present disclosure.

FIG. 2 illustrates the distributed network switch 180 having a plurality of switch modules 200 connected to the server 105, according to one embodiment of the present disclosure. The bridge elements 120 shown in FIG. 1 may be organized into one or more switch modules 200 (e.g., 200-1, 200-2, 200-3, 200-4). The distributed network switch 180 disclosed herein is configured to provide distributed FCoE switching via multiple switch modules 200, the switching layer 130 interconnecting the switch modules 200, and management firmware executing on a management controller, e.g., IOMC 140.

A switch module 200 (sometimes referred to as a chassis interconnect elements or CIE) may be a physical switch unit configured to provide network bridging for the distributed network switch 180. In one embodiment, the switch modules 200 are hardware components (e.g., PCB boards, FPGA boards, system on a chip, etc.) that provide physical support and connectivity between the network adapters 115 and the bridge elements 120, shown in FIG. 1. Each switch module 200 may include a logical or physical grouping of bridge elements 120. Each bridge element 120 may be a distributed Virtual Ethernet bridge (dVEB) configured to forward data frames throughout the distributed network switch 180, including data frames comprising FCoE frames. In one embodiment, each bridge element 120 may have at least two ports, one port connecting to the switching layer 130 and another port connected to the servers 105 and 106 (e.g., via network adapters 115). The bridge elements 120 may forward data frames transmitted by the network adapter 115 to the switching layer 130. In one implementation, a network adapter 115 and bridge element 120 may be connected using two 40 Gbit Ethernet connections or one 100 Gbit Ethernet connection.

Referring back to FIG. 2, according to one embodiment, the distributed network switch 180 may be a distributed FCF having a set of FCoE Data Forwarders 202 (FDFs) associated with at least one controlling FCF (cFCF) f204, 206 that controls the operations of the set of FDFs. The cFCFs 204, 206 defines a control plane for managing the distributed FCF and the FDFs 202 define a data plane for forwarding FCoE frames. The cFCFs and FDFs operate together to behave as a single distributed FCF such that a FCoE frame ingressing on a port in one switch module 200 may be routed to egress from a port in any other switch module 200. From an external point of view (i.e., from the perspective of the server 105), the distributed FCF behaves as an FCF. In particular, the distributed FCF supports instantiation of VN_Port to VF_Port virtual links 210 with ENode MAC addresses (i.e., CNAs 115), and instantiation of VE_Port to VE_Port virtual links (not shown) with FCF-MACs. A "VN_Port" is a Virtual N_Port and refers to a port in an Enhanced Ethernet node (ENode), and a "VF_Port" is a Virtual F_ort and refers to a port in an FCoE-capable Ethernet switch. A "VE_Port" is a Virtual E_port and refers to an inter-switch link port. From an internal point of view (i.e., from the perspective of the FCF), the distributed FCF may instantiate VA_Port to VA_Port virtual links 212 to enable FCoE frame forwarding between the cFCFs 204, 206 and FDFs 202, as well as between FDFs 202. A "VA_Port" is an instance of the FC-2V sublevel of Fibre Channel that connects to another VA_Port, and which is dynamically instantiated together with an FCoE_LEP on successful completion of a FIP ELP Exchange. VA_Port to VA_Port virtual links 212 may also be used to exchange control information between cFCFs 204, 206 and FDFs 202, as described in greater detail later.

In one embodiment, each switch module 200 may instantiate a FDF 202 (FDF), which are simplified FCoE switching entities that forward FC frames among ports through the distributed network switch 180. In one embodiment, a FDF 202 is a simplified FCoE switching element configured to forward FC frames among VA_ports and VF_ports through a Fibre Channel data-plane forwarder (FCDF) switching element. In some embodiments, an FDF 202 is functionally composed of a FCDF switching element with at least one Lossless Ethernet MAC (FDF-MAC), which may be physical or virtual ports of a switch module 200. The FDF 202 may support instantiation of VA_Ports and VF_Ports over its FDF-MACs.

In one embodiment, at least one of the switch modules 200 includes a controlling FCoE forwarder 204, 206 (sometimes referred to as a controlling FCF, cFCF, or primary controlling switch). The cFCFs are configured to control and manage FDFs 202 to provide fabric services, through the FDFs 202 on each switch module 200, to all endpoints (e.g., server 105) connected to the switch ports. In the embodiment shown in FIG. 2, the switch modules 200 include a primary cFCF 204 that controls the FDFs 202, and a secondary cFCF 206 that synchronizes state with the primary cFCF 204 and is able to resume operation in case of failure of the primary cFCF 204. Examples of FDFs and cFCFs are described in the Fibre Channel Backbone-6 (FC-BB-6) and the Fibre Channel Switch Fabric 6 (FC-SW-6) standards published by T11 working group of the International Committee for Information Technology Standards (INCITS).

According to one or more embodiments, switching elements (i.e., FDFs, cFCFs) in a distributed switch fabric are configured to compare protocols, or sets of protocols, and their corresponding versions with each other, and then modify their operations to use the determined protocol and version of the protocol when communicating with each other as part of operations of the distributed switch fabric. Embodiments of the present disclosure describe a new control-plane data frame that is exchanged between switching elements for comparing protocols. In one implementation, the control-plane data frame may be a Switch Fabric Internal Link Services (SW_ILS) frame referred to herein as a Exchange Switch Version (ESV) frame, although aspects of the present disclosure may be extended or used with other forms of messaging and signaling between switching elements.

Figure 3:
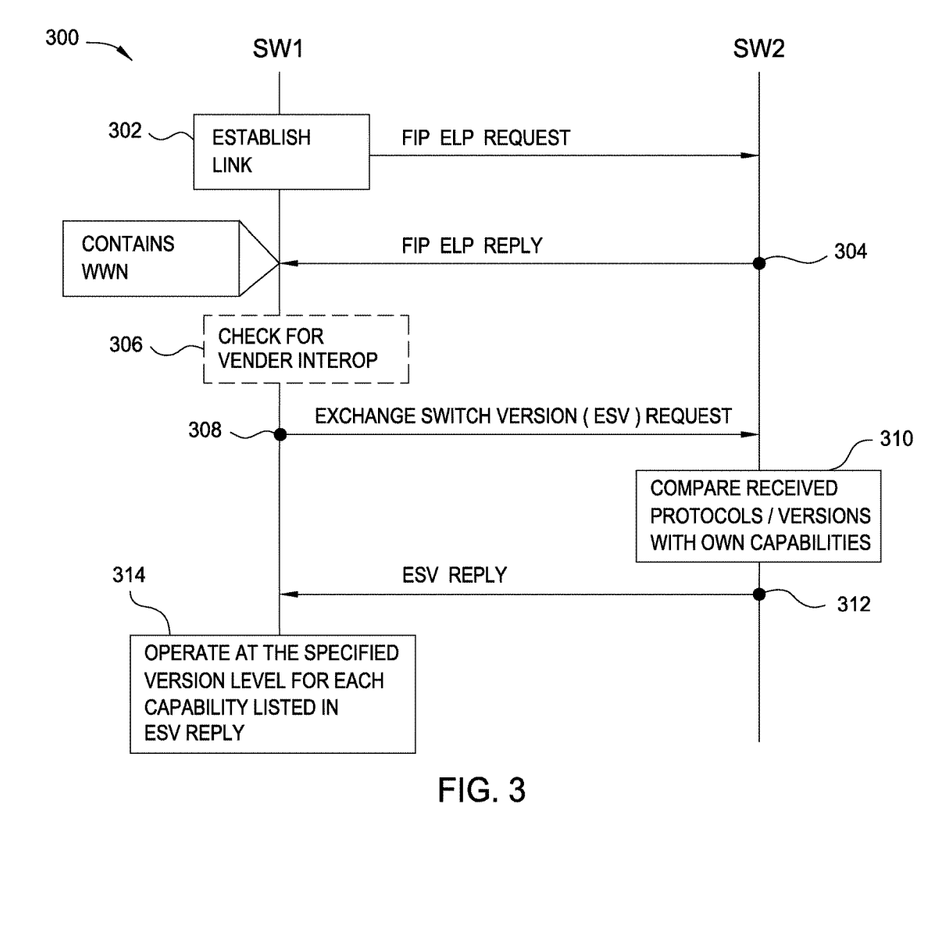
FIG. 3 is a sequence diagram depicting a method for determining versions of protocols between switching elements in a distributed switch, according to one embodiment of the present disclosure.

FIG. 3 is a sequence diagram depicting a method 300 for determining versions of protocols between switching elements in a distributed FCF, according to one embodiment of the present disclosure. FIG. 3 illustrates how switching elements (identified as SW1 and SW2) of a distributed FCF instantiate a virtual link between each other and coordinate which version of which protocols to operate with. In one example scenario, the SW2 may be a switch module 200 that was newly added to the distributed network switch 180. In another example, the SW2 may be a switch module 200 that was previously offline and is now coming online.

As shown, the method 300 begins at step 302, where a first switching element SW1 establishes a switch link between the switching element SW1 and a second switching element SW2 of the distributed FC fabric. In some embodiments, the first switching elements SW1 requests establishment of a port-to-port link between the switching elements SW1 and SW2.

In one embodiment, the switching elements SW1 and SW2 may be the cFCF 204 and the FDF 202, respectively, of the distributed FC fabric shown in FIG. 2. The cFCF 204 may establish a virtual link by transmitting an FCoE Initialization Protocol (FIP) Exchange Link Parameters (ELP) request to the FDF 202. At step 304, the FDF 202 accepts the ELP request, instantiating a virtual link between at least one port associated with the FDF 202 and at least one port associated with the cFCF 204, and transmits a FIP ELP reply (ELP ACC) back to the cFCF 204. At this point, the instantiated link becomes part of the distributed switch internal topology (i.e., the set of links internal to the distributed switch).

Optionally, at step 306, the first switching element SW1 may check for vendor interoperability of ESV itself between the switching elements SW1 and SW2. In some cases, there may be a need to know whether the ESV mechanism itself can be used with a specific peer switching element or not. For example, prior to the adoption of the ESV mechanism described herein into a protocol standard (i.e., FC-BB-6), some switching elements may provide early-adopter support for ESV, while other switching elements may not.

Accordingly, in some embodiments, the ESV mechanism may be implemented as a vendor-specific control frame (i.e., SW_ILS), such that switching elements from a same vendor may interoperate using their own vendor-specific ESV. Vendors can choose a SW_ILS command code for their implementation of ESV from the vendor-specific codes available to switch fabric vendors, e.g., reserved values 70000000h to 7FFFFFFFh or 90000000h to 9FFFFFFFh region.

In one embodiment, during VA/VE link establishment, ELP frames are exchanged between the two switching elements SW1 and SW2. The ELP frames may contain the originating switch world-wide-name (WWN) in its payload. The organization unique identifier (OUI) present in the originating switch WWN can be used to determine whether the peer switching element belongs to the same vendor (or an interoperating vendor) or not. In some embodiments, SW1 determines a vendor identifier associated with the switching element SW2 and checks whether the switching element SW2 belongs to a same vendor as the switching element SW1, or in some embodiments, belongs to another vendor which is known to interoperate with the vendor of the switching element SW1. If so, responsive to determining the second switching element SW2 belongs to a vendor having a predetermined interoperability with the vendor of SW1 based on the vendor identifier, SW1 may proceed to step 308 below. Otherwise, responsive to determining that SW2 is from a different vendor (that is not known to interoperate with SW1's vendor), the first switching element SW1 may skip the ESV phase of communications. In some embodiments, the vendor identifier is determined based on the WWN of the second switching element S2 received during the establishment of the switch link. In embodiments where the distributed FC fabric includes cascaded FDFs, the vendor identifier may be determined based on the switch WWN present in the FCDF Reachability Notification (FDRN) message relayed to the cFCF by one or more intermediary FDFs.

At step 308, the first switching element SW1 transmits, to the second switching element SW2, a control-plane frame that includes an ESV request specifying a list of one or more protocols and corresponding versions of those protocols that are supported by the first switching element SW1. In some embodiments, the control-plane frame may be a SW_ILS frame having a command code that designates the frame as an ESV frame. The value of the command code may be pre-defined by a protocol standard, such as FC-BB-6, or by a vendor-specific implementation. One example embodiment of the format for an Exchange Switch Version (ESV) request payload is shown in Table 1, although other message formats may be used.

TABLE 1

| Exchange Switch Version (ESV) Request Payload | |
|---|---|
| Field | Size (bytes) |
| ESV Command Code | 4 |
| Destination Switch Name | 8 |
| Source Switch Name | 8 |
| Descriptor List Length | 4 |
| Capability Descriptor #1 | Variable |
| ... | |
| Capability Descriptor #N | |

As shown in Table 1, the ESV Request message may include a plurality of fields, including a SW_ILS command code that specifies an ESV Request, a Destination Switch Name which may contain the Switch_Name of the destination switching element (e.g., FDF), an Source Switch Name which may contain the Switch_Name of the originating switching element (e.g., cFCF), a Descriptor List Length which contains the length in bytes of the subsequent list of descriptors, and Capability Descriptors which contain a list of one or more protocols and corresponding versions that are supported by the switching element. In one embodiment, the capability descriptor may be formatted according to a VA_Port SW_ILS descriptor format provided by the FC-SW-6 standard. One example format of a capability descriptor is shown in Table 2.

TABLE 2

| ESV Capability Descriptor Format | |
|---|---|
| Field | Size (bytes) |
| Tag Value = [Capability_Desc] | 4 |
| Length | 4 |
| Capability Code | 4 |
| Least supported version | 4 |
| Highest supported version | 4 |

As shown, in one embodiment, each capability descriptor may include a pre-defined tag value (e.g., 0015h) that designates the descriptor as a Capability Descriptor. Each capability descriptor includes a capability code that denotes a single protocol, or a set of protocols, in the case of a distributed protocol such as FC-BB-6, and one or more associated supported version(s). For example, the capability codes may be pre-defined values corresponding to the FC-SW-5 protocol, FC-BB-6 protocol, and other protocols. The version(s) associated with a protocol, or set of protocols, may be selected from predefined values set by a standards body or entity, or, in some cases, may be arbitrary values that map to official versions of a protocol set by a standards body or entity. In some embodiments, the version(s) associated with a protocol or set of protocols may be vendor-specific values predefined by a vendor or provider of switch modules.

In one or more embodiments, the supported version(s) specified by the capability descriptor may indicate a range of versions of the protocol that are supported by a switching element. As shown in Table 2, the capability descriptor may include a Least Supported Version that indicates an earliest version of the associated protocol that is supported by the switching element and a Highest Supported Version that indicates the latest version of the associated protocol that is supported by the switching element. The supported version may be a numerical value (e.g., "1.0") or numeric-like value (e.g., "2.5.2") corresponding to version numbers of the associated protocol, although the supported version may be any comparable value, i.e., any value having a natural ordering such that it may be compared to another value (e.g., "A" and "B"). In some embodiments, a least supported version having a zero value (or other pre-defined value) may denote that all prior versions of the protocol are supported by the switching element. In some embodiments, the least support version and the highest supported version may have identical values, indicating that single version of the protocol is supported by the switching element. In alternative embodiments, the supported version(s) may be represented as a bitmap value, where each bit corresponds to a discrete version of the associated protocol, and a non-zero value of a bit denotes support for the corresponding discrete version.

Referring back to FIG. 3, at step 310, the second switching element SW2 receives the ESV Request message and compares the received list of protocols and associated versions with its own capabilities. For each capability specified by the capability descriptors, the switching element SW2 determines whether SW2 is configured to support a corresponding capability, as identified by the capability code of the descriptor, and if so, at a version level within the range of supported versions. As such, the switching element SW2 determines an "accepted" version for each protocol specified by the capability descriptors that is mutually supported by the first switching element SW1 and the second switching element SW2. In one example, the switching element SW2 selects a highest version supported by SW2 that is also within the supported range of versions supported by SW1.

At step 312, responsive to determining that SW2 is able to operate at some version level within the specified range(s) for all of the capabilities listed in the ESV Request, the second switching element SW2 generates and transmits a control-plane response frame includes an ESV Acceptance (ESV ACC) that lists each capability and the associated version supported by SW2. In one embodiment, the switching element SW2 may modify its internal state to operate the switch link established between the SW1 and the SW2 using the accepted versions of the protocols. If the SW2 is unable to operate on a version level within a specified range for one or all of the capabilities listed in the ESV Request, the second switching element SW2 may notify SW1 and terminate the switch link between the SW1 and SW2, as described in greater detail in conjunction with FIG. 5.

In one embodiment, ESV Acceptance frame may have a format similar to the ESV Request frame shown in Tables 1 and 2. For example, the response control-plane frame may be a SW_ILS frame having a command code that designates the frame as an ESV message and a plurality of capability descriptors. In some embodiments, the plurality of capability descriptors in the ESV Acceptance Frame specify a list of one or more protocols that were initially proffered by the first switching element SW1 and corresponding accepted versions of those protocols determined to be mutually supported by both SW1 and SW2. In one implementation, each capability descriptor contains a lowest supported version field and a highest supported version field set to the same identical value, i.e., the accepted version of that protocol.

At step 314, the first switching element SW1 receives the response control-plane frame having the ESV Acceptance and retrieves the accepted version specified for each capability in the ESV Acceptance. In one embodiment, for each capabilities listed in the ESV Acceptance message, the first switching element operates the switch link between SW1 and SW2 using the accepted version level of the protocol based on each capability descriptor contained in the ESV Acceptance frame. In some cases, the SW1 may modify its operating state to use an accepted version for a protocol that is lower than its highest supported version of that protocol, and in other cases, the SW1 may operate the switch link using an accepted version higher than its lowest supported version of that protocol.

While FIG. 3 depicts the second switching element SW2 performing the comparison that determines the accepted versions of each protocol to be used on the switch link, it should be recognized that in other embodiments of the present disclosure may be utilized in which the first switching element SW1 performs the comparison instead.

Figure 4:
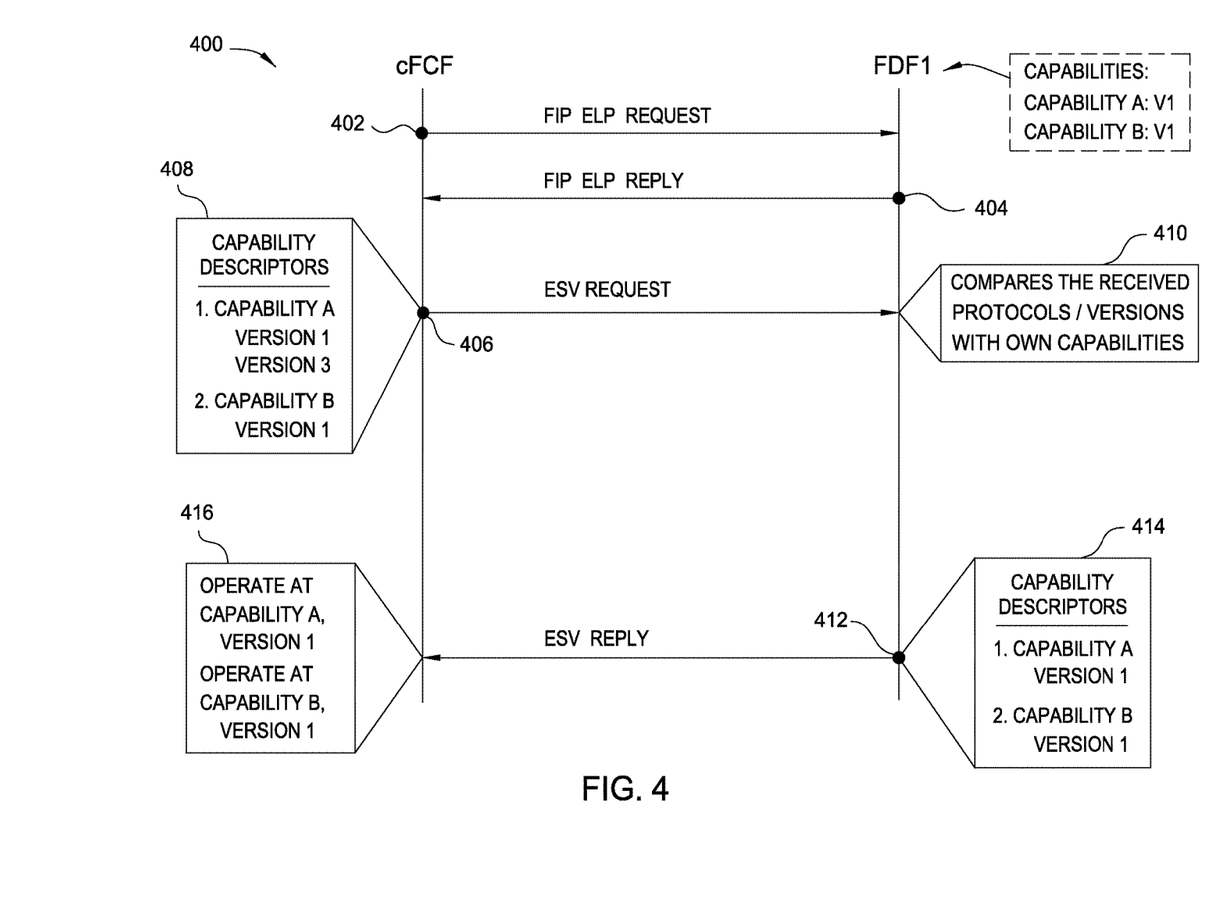
FIG. 4 is a sequence diagram depicting example operations for determining versions of protocols between switching elements in a distributed fabric, according to one embodiment of the present disclosure.

FIG. 4 is a sequence diagram depicting example operations 400 for determining versions of protocols between switching elements in a distributed FCF, according to one embodiment of the present disclosure. Specifically, FIG. 4 illustrates how a cFCF 204 and a FDF 202 (identified as FDF1) in a distributed FCF instantiates a virtual link between each other and negotiate which version of which protocols to operate with, using the techniques described herein.

As shown in FIG. 4, FDF1 is configured to support version 1 (v1) of a first capability (shown as Capability A), as well as version 1 (v1) of a second capability (shown as Capability B). The cFCF is configured to support versions 1 and 2 of the Capability A, as well as version 1 of Capability B. As an example, Capability A may represent a set of protocols associated with distributed FCF functionality (e.g., FC-SW-6), which can one or more official standard releases of that protocol (e.g., FC-SW-6 rev1.2). In some cases, providers of switch modules may have proposed extensions and other changes to that protocol, for example, an additional mechanism for automatically joining a FDF to the fabric. While the proposed extension is being reviewed and/or ratified by a standards body, a provider of switch modules may desire to implement the proposed extensions in their switch modules anyway. As such, a distributed FCF may be a "mixed" fabric, having some switching element (e.g., FDF1) with older firmware that supports only the standard protocol, and switching elements (e.g., cFCF) with newer firmware that supports the protocol extensions. Specifically, the cFCF may be configured to support version 1 of Capability A, representing the official standards release of that protocol, and version 2 of Capability A, which represents the standard protocol plus the protocol extension.

The operations 400 begins at step 402, where the cFCF 204 transmits a FIP Exchange Link Parameters (ELP) request to the FDF1 that requests establishment of a port-to-port link to the FDF1. At step 404, the FDF1 accepts the ELP request, instantiating a virtual link between at least one port associated with the FDF1 and at least one port associated with the cFCF 204, and transmits a FIP ELP reply back to the cFCF 204. While FIG. 4 depicts switching elements of a distributed FCF (e.g., cFCF 204, FDF 202) interconnected using FCoE, it should be recognized that other embodiments of a distributed FCF having switches interconnected using either FC or FCoE may be used. In such embodiments, this hybrid nature mandates that version control may not be performed using FIP (which is only used for interconnecting switching elements using FCoE).

Upon establishing a virtual link to communicate with each other, at step 404, the cFCF 204 transmits an ESV request containing a list of protocols and corresponding versions that are supported by the cFCF. For example, the ESV request 408 includes a plurality of capability descriptors specifying that the cFCF supports Capability A and Capability B. In the example shown, a first capability descriptor indicates that the lowest version of Capability A that the cFCF supports is version 1, and that the highest version of Capability A that the cFCF supports is version 3, i.e., a range of versions from v1 to v3 is supported. A second capability descriptor indicates that the cFCF supports version 1 of Capability B. In one example, the second capability descriptor may specify the lowest supported version of Capability B is version 1 and the highest supported version of Capability B is also version 1.

At step 410, the FDF1 receives the ESV request containing the list of protocols and corresponding versions that are supported by the cFCF and compares the received protocols/versions with its own supported capabilities. For example, the FDF1 identifies that the ESV request includes the first capability descriptor for Capability A and determines the FDF1 supports version 1 of the same Capability A. Because version 1 is the highest version that both switching elements support, the FDF1 deems version 1 of Capability A as the accepted version to be used in operations. The FDF1 then identifies that the ESV request include the second capability descriptor for Capability B and determines that the FDF1 supports version 1 of the same Capability B. Similarly, the FDF1 deems version 1 of Capability B as the accepted version to be used in operations.

At step 412, responsive to determining that the FDF1 has determined an accepted version for all of the capabilities listed in the ESV Request, the FDF1 generates and transmits to the cFCF an ESV reply containing the list of protocols and corresponding versions that have been accepted by the FDF1. For example, the ESV reply 414 includes a plurality of capability descriptors specifying version 1 of Capability A and version 1 of Capability B that the FDF1 has determined are mutually supported by both FDF1 and the cFCF. In some embodiments, a first capability descriptor for Capability A has identical values (i.e., version 1) for the lowest supported version and the highest supported version, indicating this is the accepted version for Capability A. Similarly, the second capability descriptor for Capability B has identical values (specifying "v1") for the lowest supported version and the highest support version, indicating this is the accepted version for Capability B.

At step 416, responsive to receiving, from the FDF1, the ESV reply containing the list of protocols and corresponding versions, the cFCF 204 modifies its operations to operate at the specified versions of the protocols using the switch link with the FDF1. In one implementation, the cFCF 204 may maintain an internal FCF list containing FDF1 and other FDFs that are part of the distributed FC fabric. The cFCF may modify an entry in the internal FCF list associated with the FDF1 to store the accepted versions of the protocols that are mutually supported by the cFCF and FDF1. As such, the cFCF can keep track of different accepted versions of protocols on a per-FDF basis, which enables the cFCF to simultaneously operate at different levels with different FDFs in the distributed FC fabric. In the example shown in FIG. 4, the cFCF 204 operates the switch link with the FDF1 using version 1 of Capability A and using version 1 of Capability B. Similarly, the FDF1 operates the switch link with the cFCF 204 using version 1 of Capability A and using version 1 of Capability B, as determined in step 412 above.

Figure 5:
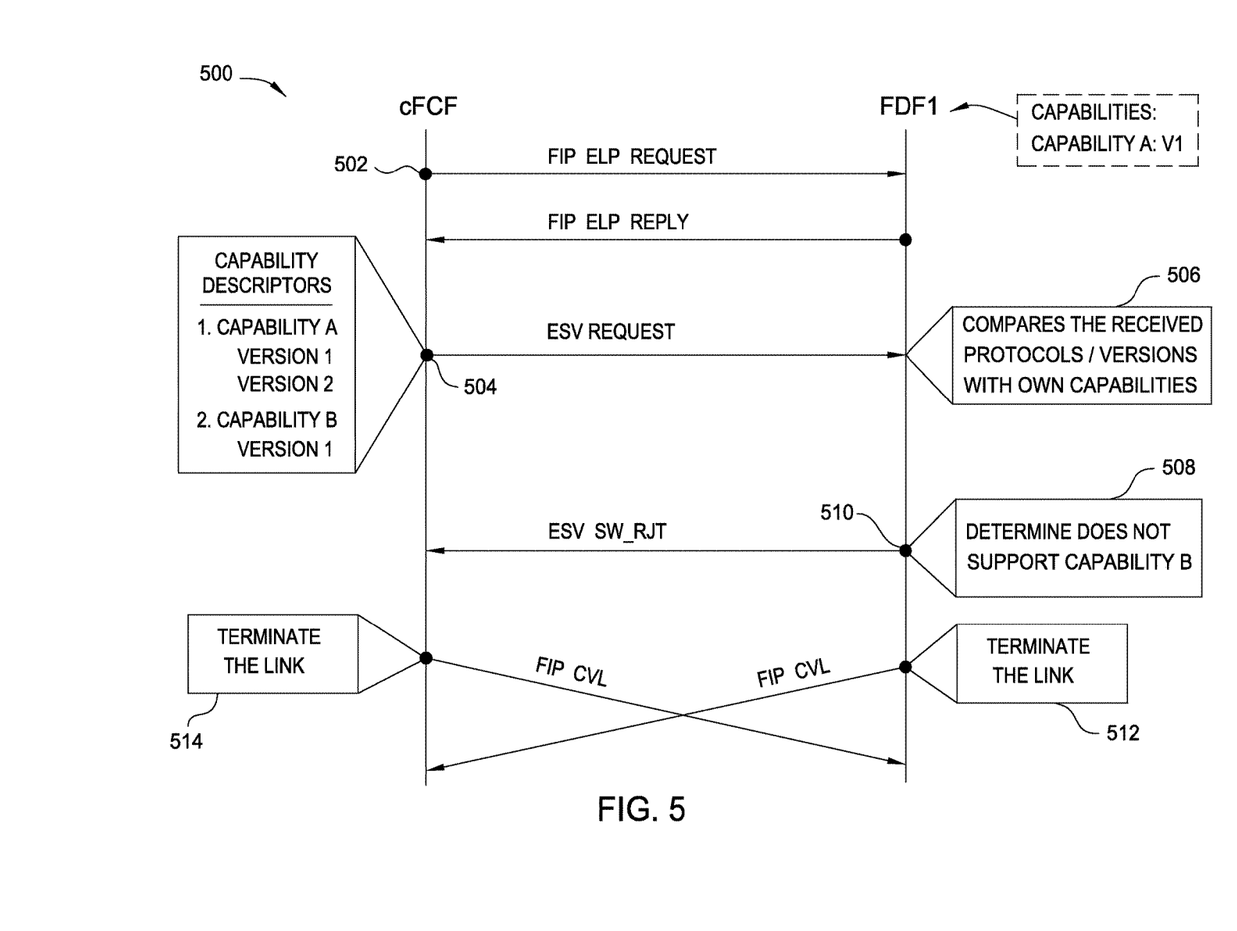
FIG. 5 is a sequence diagram depicting other example operations between switching elements in a distributed fabric, according to one embodiment of the present disclosure.

FIG. 5 is a sequence diagram depicting other example operations 500 between switching elements in a distributed FCF, according to one embodiment of the present disclosure. Specifically, FIG. 5 illustrates a scenario of different switching elements (cFCF 204 and FDF1) in a distributed FCF that have incompatible capabilities. For this example, the cFCF is configured to support versions 1 and 2 of a first capability (shown as Capability A), as well as version 1 of a second capability (Capability B). FDF1 is configured to support version 1 (v1) of Capability A, but does not support Capability B at all.

The operations 500 begins at step 502, where the cFCF 204 transmits a FIP Exchange Link Parameters (ELP) request to the FDF1 that requests establishment of a port-to-port link to the FDF1. The FDF1 accepts the ELP request, and transmits a FIP ELP reply back to the cFCF 204.

At step 504, the cFCF 204 transmits an ESV request containing a list of protocols and corresponding versions that are supported by the cFCF. For example, the ESV request includes a plurality of capability descriptors specifying that the cFCF supports versions 1 and 2 of Capability A and version 1 of Capability B.

At step 506, the FDF1 receives the ESV request containing the list of protocols and corresponding versions that are supported by the cFCF and compares the received protocols/versions with its own supported capabilities. Similar to operations 400, the FDF1 identifies that the ESV request includes the first capability descriptor for Capability A and determines the FDF1 supports version 1 of the same Capability A. Because version 1 is the highest version that both switching elements support, the FDF1 deems version 1 of Capability A as the "accepted" version to be used in operations.

However, unlike in FIG. 4, the FDF1 then identifies that the ESV request includes the second capability descriptor for Capability B and determines that the FDF1 does not support the Capability B. Because at least one of the capabilities proffered by the cFCF (i.e., via the ESV request) is unsupported by the FDF1, the FDF1 deems the cFCF 204 to be incompatible with the FDF1. Although in this example the requested capability (Capability B) is completely unsupported by the FDF1, it should be recognized that other examples of unsupported capabilities may be apply. In another example, the cFCF may have specified supported versions 2 to 3 of Capability A that were outside the range of the FDF1's support for version 1 of Capability A.

In one embodiment, at step 510, responsive to determining at least one of the specified capabilities is unsupported by the FDF1, the FDF1 may transmit a control-plane rejection message to the cFCF, instead of an ESV reply message. In some embodiments, the control-plane rejection message may be a SW_ILS Reject message, also referred to as SW_RJT, that notifies the cFCF (which transmitted the ESV request) that the SW_ILS ESV request sequence has been rejected. The SW_RJT message may contain a pre-defined reason code (e.g., 4-byte value) and/or a reason code explanation text that indicates the switching element is using an unsupported protocol and is incompatible.

At step 512, the FDF1 terminates the virtual link between the switching elements, and transmits a control-plane message to the cFCF indicating the virtual link is being de-instantiated. In one implementation, the FDF1 may generate and transmit a FIP Clear Virtual Links (CVL) frame that specifies the virtual link with the cFCF and the associated VA_Ports to be de-instantiated. In some embodiments, the FIP CVL frame may include a reason code descriptor indicating that unsupported protocol versions as the reason for clearing the virtual link.

At step 514, responsive to receiving the control-plane rejection message from the FDF1, the cFCF may de-instantiate the virtual link(s) associated with that FDF1 (e.g., VA_Port to VA_Port virtual link 212), along with the associated ports (e.g., the associated VA_Port), and remove the FDF1 from an internal FCF list. In one embodiment, the cFCF 204 de-instantiates the virtual links associated with the FDF by generating and transmitting, to the FDF1, a FIP Clear Virtual Links frame that specifies the virtual link with the cFCF and associated VA_Ports to be de-instantiated.

According to one or more embodiments, the switching elements of the distributed FCF may be configured to initiate ESV signaling at any time, not just upon first instantiation of a virtual link between the switching elements. In embodiments in which a switching element of the distributed FCF is configured to dynamically change their operating protocol versions, the switching element may renegotiate, using the ESV messages, with a peer switching element to operate at a higher version.

Figure 6A:
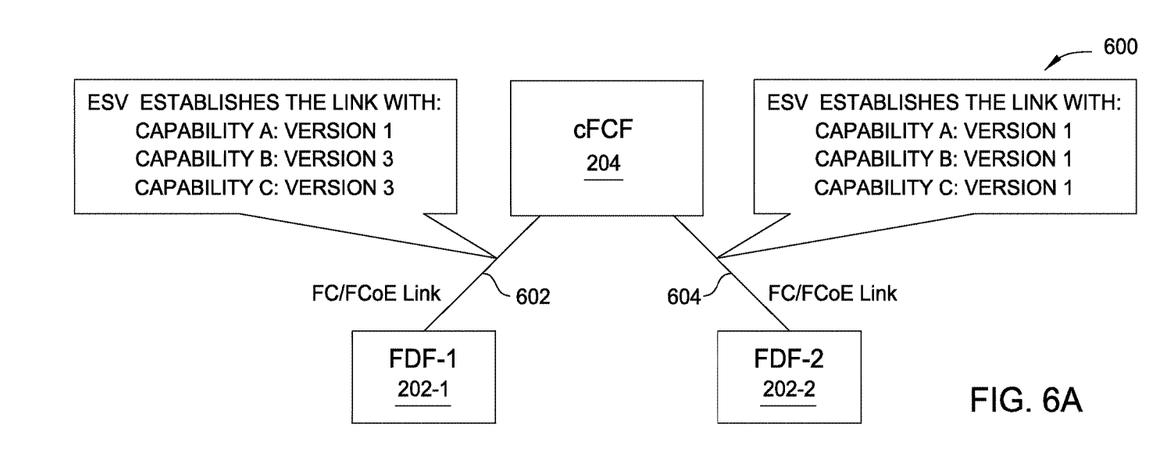
FIGS. 6A and 6B are block diagrams depicting switching elements of a distributed fabric configured to upgrade protocol versions and renegotiate operating levels, according to one embodiment of the present disclosure.
Figure 6B:
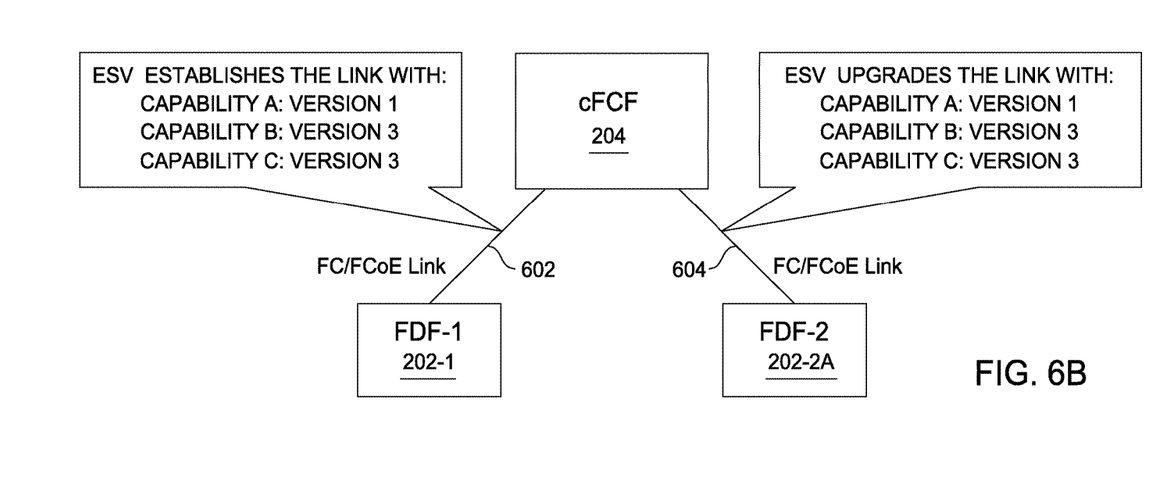

FIGS. 6A and 6B are block diagrams depicting switching elements of a distributed FCF 600 configured to upgrade protocol versions and renegotiate operating levels, according to one embodiment of the present disclosure. The distributed FCF 600 includes a cFCF 204 having a first link 602 established to a first FDF 202-1 (FDF1) and having a second link 604 established to a second FDF 202-2 (FDF2). As shown, the links 602, 604 are configured to carry FCoE frames, or in other embodiments, may be configured to carry FC frames.

In one embodiment, the distributed FCF 600 may use ESV messages to establish operating versions of the protocol between two particular peers, and the negotiated operating version does not necessarily apply to the rest of distributed FCF 600. In the embodiment shown in FIG. 6A, the cFCF 204 has used ESV messaging to establish the first link 602 with the FDF1 having different capabilities (i.e., different protocols or different version of protocols) than the second link 604 established with the second FDF2. For example, the cFCF has established with the FDF1 an operating version of Version 1 for Capability A, Version 3 for Capability B, and Version 3 for Capability C, based on the mutually supported capabilities determined using ESV. In contrast, the cFCF has established with the other switching element, FDF2, operating versions of Version 1 for all of Capability A, Capability B, and Capability C.

In FIG. 6B, the second switching element FDF2 has been upgraded, as identified as FDF 202-2A, and may now be configured to support different (higher) versions of the protocols. In one embodiment, the second switching FDF2 has been upgraded dynamically, i.e., without logging out of the distributed FCF, rebooting, etc. In one example, FDF2 may now be able to support up to version 3 of Capability B and support up to version 3 of Capability C. Even though the FDF2 may now support higher operating versions for Capabilities B and C, the FDF2 continues to operate the link 604 using the previously established operating levels (version 1) with the cFCF. In one embodiment, the FDF2 may transmit a notification to the cFCF indicating the FDF2 has been changed, and that the operating protocol versions may be changed as well.

Accordingly, responsive to detecting the switching element FDF2 has been modified, cFCF 204 may transmit an ESV Request frame containing the list of protocols (e.g., Capability A, B, C) and corresponding versions supported by the cFCF 204. Upon receiving the ESV request, the switching element FDF2 may compare the list of protocols and corresponding version to its own, now upgraded, capabilities. For example, the FDF2 identifies that the ESV request includes the first capability descriptor for Capability A, and determines that version 1 is the accepted version for Capability A. The FDF2 then identifies that the ESV request include the second capability descriptor for Capability B and determines that the FDF2 (now) supports up to version 3 of the same Capability B. As such, the FDF2 deems version 3 of Capability B as the accepted version to be used in operations. A similar determination is made with regards to supported operating version 3 for Capability C.

The FDF2 generates and transmits, to the cFCF, an ESV reply frame indicating the list of capabilities and corresponding accepted versions, which are different from the versions previously accepted between the cFCF and FDF2. Responsive to determining the accepted version of the capabilities, the cFCF and the FDF2 operate at the new operating protocol versions as specified by the ESV reply frame. For example, the cFCF modifies its operational state from operating the second link 604 with the FDF2 using version 1 for Capability B (and C) to operating the second link 604 using version 3 for Capability B (and C).

Although FIG. 6B depicts an upgrade of FDF2 that enables support for higher protocol versions of existing capabilities, it should be recognized that the described techniques for dynamically renegotiating may be applied to any change in the switching elements, including upgrades that add a new capability, downgrades that decrease the highest supported version of an existing capability, changes that remove entire capabilities, and changes that increase the lowest supported version for a capability (i.e., removing backwards compatibility). It should be further recognized that during the renegotiation, the switching elements can determine one or more capabilities are now unsupported by the other and terminate the link 604.

Accordingly, embodiments of the present disclosure provide a mechanism where two components of a distributed FCF (e.g., cFCF and FDF) have the ability to establish a link, virtual or real, between the components at a level of operation that is mutually compatible with respect to the various capabilities offered by the two components. The described mechanism also provides a switching element with the ability to simultaneously operate at different levels with different switching elements in the fabric. As described above, the level of operation established using ESV frames is done per pair of switching elements. The described mechanism also provides the establishment of a level of operation at the granularity of individual capabilities offered by the switching elements. As such, a given pair of switching elements can offer at a different version for different capabilities. The described mechanism further provides the ability to dynamically switch to a higher or lower level of operation for any or all of the capabilities defined by the pair of switching elements, or to dynamically start operating with a new capability. Embodiments of the present disclosure further provide a mechanism for checking for third-party interoperability in exchanging ESV frames.

While the foregoing is directed to embodiments of the present disclosure, other and further embodiments of the present disclosure may be devised without departing from the basic scope thereof, and the scope thereof is determined by the claims that follow.

What is claimed is:

1. A method for managing a distributed Fibre Channel (FC) fabric, the method comprising:
   establishing a switch link between a first switching element and a second switching element of the distributed FC fabric;
   transmitting, to the second switching element, a control-plane request frame that specifies at least one version of a protocol supported by the first switching element, wherein the control-plane request frame includes a capability descriptor comprising a code identifying the protocol, a lowest supported version value for the protocol, and a highest supported version value for the protocol, and wherein the lowest supported version value and the highest supported version value are specified in distinct fields in the capability descriptor;
   receiving, from the second switching element, a control-plane response frame that specifies an accepted version of the protocol mutually supported by the first switching element and the second switching element; and
   operating the switch link established between the first switching element and the second switching element using the accepted version of the protocol.

2. The method of claim 1, wherein the first switching element comprises a controlling FC forwarder (cFCF) of the distributed FC fabric, and the second switching element comprises a first FC data-plane forwarder (FDF) of the distributed FC fabric.

3. The method of claim 1, wherein the control-plane request frame comprises a Switch Fabric Internal Link Services (SW_ILS) frame having a plurality of capability descriptors that specify a list of protocols and corresponding versions supported by the first switching element.

4. The method of claim 1, wherein the control-plane response frame comprises another capability descriptor including the code identifying the protocol, a lowest supported version field, and a highest supported version field, the lowest supported version field and the highest supported version field both being set to the accepted version of the protocol.

5. The method of claim 1, wherein the lowest supported version value and the highest supported version value in the control-plane request frame specify a range of versions of the protocol supported by the first switching element, and wherein the accepted version of the protocol specified by the control-plane response frame is within the range of versions of the protocol supported by the first switching element.

6. The method of claim 1, further comprising:
responsive to receiving an indication that the second switching element does not support the protocol specified by the control-plane request frame, de-instantiating the switch link between the first switching element and the second switching element.

7. The method of claim 1, wherein the accepted version of the protocol comprises a first accepted version of the protocol, and wherein the method further comprises:
responsive to receiving an indication that the second switching element has been upgraded, transmitting a second control-plane request frame to the second switching element;
receiving, from the second switching element, a second control-plane response frame that specifies a second accepted version of the protocol mutually supported by the first switching element and the upgraded second switching element, wherein the second accepted version is different from the first accepted version; and
operating the switch link established between the first switching element and the second switching element using the second accepted version of the protocol.

8. The method of claim 1, further comprising, prior to transmitting to the second switching element the control-plane request frame that specifies the at least one version of the protocol supported by the first switching element:
determining a vendor identifier associated with the second switching element based on a world-wide-name (WWN) of the second switching element received during the establishment of the switch link; and
determining the second switching element belongs to a vendor having a predetermined interoperability with the first switching element based on the vendor identifier associated with the second switching element.

9. The method of claim 1, wherein the accepted version of the protocol comprises a first accepted version of the protocol, and wherein the method further comprises:
establishing a second switch link between the first switching element and a third switching element of the distributed FC fabric;
negotiating with the third switching element a second accepted version of the protocol mutually supported by the first switching element and the third switching element, wherein the second accepted version of the protocol is different from the first accepted version of the protocol; and
operating the second switch link established between the first switching element and the third switching element using the second accepted version of the protocol.

10. A method for managing a distributed Fibre Channel (FC) fabric, the method comprising:
establishing a switch link between a first switching element and a second switching element of the distributed FC fabric;
receiving, from the first switching element, a control-plane request frame that specifies at least one supported version of a protocol supported by the first switching element, wherein the control-plane request frame includes a capability descriptor comprising a code identifying the protocol, a lowest supported version value for the protocol, and a highest supported version value for the protocol, and wherein the lowest supported version value and the highest supported version value are specified in distinct fields in the capability descriptor;
determining an accepted version of the protocol that is mutually supported by the first switching element and the second switching element based on a comparison of the at least one version of the protocol supported by the first switching element to a list of capabilities associated with the second switching element;
transmitting, to the first switching element, a control-plane response frame that specifies the accepted version of the protocol; and
operating the switch link established between the first switching element and the second switching element using the accepted version of the protocol.

11. The method of claim 10, wherein the first switching element comprises a controlling FC forwarder (cFCF) of the distributed FC fabric, and the second switching element comprises a first FC data-plane forwarder (FDF) of the distributed FC fabric.

12. The method of claim 10, wherein the control-plane request frame comprises a Switch Fabric Internal Link Services (SW_ILS) frame having a plurality of capability descriptors that specify a list of protocols and corresponding versions supported by the first switching element.

13. The method of claim 10, wherein the control-plane response frame comprises another capability descriptor including the code identifying the protocol, a lowest supported version field, and a highest supported version field, the lowest supported version field and the highest supported version field both being set to the accepted version of the protocol.

14. The method of claim 10, wherein the lowest supported version value and the highest supported version value in the control-plane request frame specify a first range of versions of the protocol supported by the first switching element;
wherein the list of capabilities associated with the second switching element comprises a second range of versions of the protocol supported by the second switching element; and
wherein determining the accepted version of the protocol that is mutually supported by the first switching element and the second switching element based on the comparison of the at least one version of the protocol supported by the first switching element to the list of capabilities associated with the second switching element further comprises:
selecting a highest version in the second range of versions of the protocol supported by the second switching element that is within the first range of versions of the protocol supported by the first switching element.

15. The method of claim 10, further comprising:
responsive to determining that the second switching element does not support the protocol specified by the control-plane request frame, de-instantiating the switch link between the first switching element and the second switching element.

16. The method of claim 10, wherein the accepted version of the protocol comprises a first accepted version of the protocol, the method further comprising:
modifying the list of capabilities with the second switching element;
determining a second accepted version of the protocol that is mutually supported by the first switching element and the second switching element based on a comparison of the at least one supported version to the modified list of capabilities;

transmitting, to the first switching element, a second control-plane response frame that specifies the second accepted version of the protocol, wherein the second accepted version is different from the first accepted version; and operating the switch link established between the first switching element and the second switching element using the second accepted version of the protocol.

* * * * *